United States Patent [19]

Exley

[11] 4,313,643
[45] Feb. 2, 1982

[54] EMERGENCY BRAKE SYSTEM EMPLOYING SHUTTLE VALVE

[75] Inventor: Vern R. Exley, Conneaut Lake, Pa.

[73] Assignee: Joy Manufacturing Company, Pittsburgh, Pa.

[21] Appl. No.: 113,011

[22] Filed: Jan. 18, 1980

[51] Int. Cl.³ .............................................. B60T 13/22
[52] U.S. Cl. ..................................... 303/71; 188/170; 303/2; 303/84 A; 303/85
[58] Field of Search ...................... 303/10, 71, 13, 23, 303/84 A, 84 R, 85, 80, 14; 188/170, 72.3, 151 A

[56] References Cited

U.S. PATENT DOCUMENTS 3,272,566  9/1966  Clack ................................ 303/71 X
4,119,355 10/1978  Kreitner ........................... 303/71 X Primary Examiner—Douglas C. Butler
Attorney, Agent, or Firm—Buell, Blenko, Ziesenheim & Beck

[57] ABSTRACT

An emergency brake system for mine shuttle cars and the like wherein the brakes are applied by spring pressure and are normally released only when the hydraulic system for the shuttle car is activated. In the present invention, a hand pump is provided for releasing the brakes when the normal hydraulic system is not activated. This facilitates moving the shuttle car when it is not connected to a source of power. When the car is again connected to a power source and its hydraulic system activated, a shuttle valve initially releases the pressure produced by the hand pump and then returns the system to normal operation.

7 Claims, 4 Drawing Figures

EMERGENCY BRAKE SYSTEM EMPLOYING SHUTTLE VALVE

BACKGROUND OF THE INVENTION

While not limited thereto, the present invention is particularly adapted for use with electrically-operated mine shuttle cars. Such vehicles must be equipped with spring-loaded emergency brakes which are applied by springs (usually Belleville washers) when power is removed from the car and released by hydraulic pressure when power is again applied. The object of the emergency brake system is to meet the requirements of an automatically-applied emergency brake system capable of holding the shuttle car on a 15° slope without the use of onboard power.

In the past, the emergency brakes for such shuttle cars have been released by an operator-operated valve which is effective to release the brakes only when power is applied to the car and hydraulic pressure is available. The difficulty with this method is that when the car is not under power as, for example, when it is being transported outside the mine or when the operator has run the car out of reach of the power cable and disconnected himself from the power line, it is necessary to drag the car with the emergency brakes locked. Needless to say, this is an undesirable condition and causes unnecessary wear on the brakes, tires and other component parts.

SUMMARY OF THE INVENTION

In accordance with the present invention, an auxiliary source of hydraulic pressure is employed to release spring-loaded brakes on a vehicle when no power is supplied to the vehicle, thereby enabling it to be pulled or pushed in the absence of applied power with the brakes released. Preferably, the auxiliary source of power comprises an operator-operated hand pump which supplies high pressure fluid through a shuttle valve to the brake cylinders. The shuttle valve is such that when power is again applied to the vehicle, the pressure supplied by the hand pump is initially dumped, followed by reapplication of pressure from a power-driven pump to maintain the brakes released. Initial dumping of the hand pump pressure in this manner is essential to insure that a solenoid-operated valve can release pressure to the brakes to reapply them in the event of an electrical failure.

In the preferred embodiment of the invention, the shuttle valve includes a pair of check valves which can be opened to permit flow in either direction by cam followers riding on the surface of a hydraulically-actuated spool. One of the valves, when open, connects the brake means to a hydraulic reservoir to thereby release the brakes; while the other of the valves, when open, is adapted to connect the brake cylinders to a power-operated pump. When the spool is actuated, the first valve opens initially to dump the brake pressure, and then closes. The other valve, however, remains open as long as hydraulic power is available on the vehicle.

The above and other objects and features of the invention will become apparent from the following detailed description taken in connection with the accompanying drawings which form a part of this specification, and in which.

Figure 1:
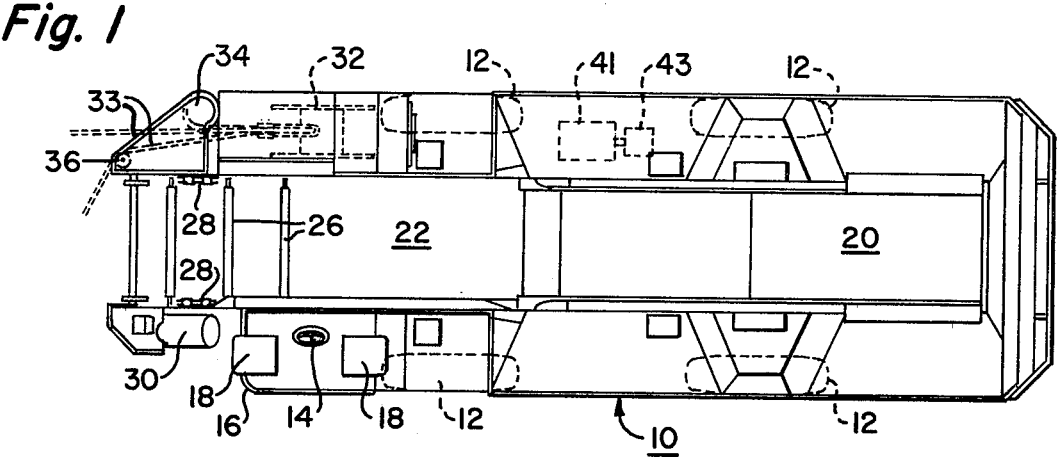
FIG. 1 is a top view of a mine shuttle car with which the present invention may be used.
Figure 2:
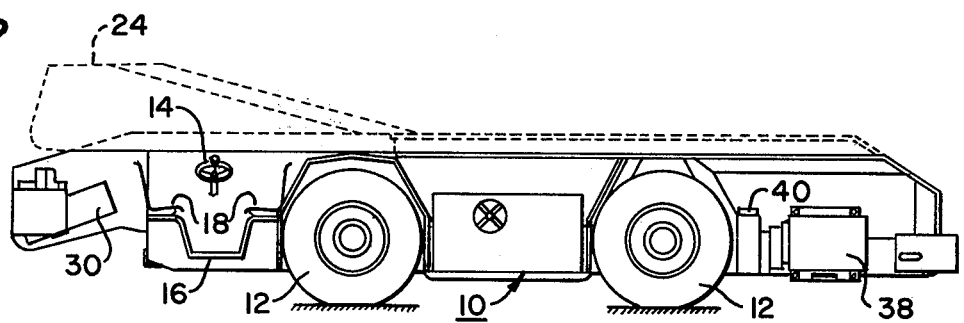
FIG. 2 is a side view of the shuttle car shown in FIG. 1.

With reference now to the drawings, and particularly to FIGS. 1 and 2, the mine shuttle car shown includes a body 10 mounted on wheels 12. The wheels 12 may be controlled by means of a steering wheel 14 mounted above an operator's platform 16 having seats 18 on which the operator sits. The body 10 is provided with a trough-shaped material receiving portion 20 and a material discharge portion 22. Discharge portion 22 is pivotally connected to the frame 10 and can be elevated from the full-line position shown in FIG. 2 to the broken-line position indicated by the reference numeral 24. Extending along the bottom of the trough-shaped portions 20 and 22 is a flight conveyor 26 driven by means of chains 28 which pass around sprockets at the ends of the body 10. The flight conveyor, in turn, is driven by means of an electric motor 30 mounted on the forward end of the discharge portion 22. On the side of the body 10 opposite the drive motor 30 is a hydraulically-driven electrical cable reel 32. Wound on the cable reel 32 is an electrical power cable 33 adapted to pass around either reel 34 or reel 36, depending upon whether the cable extends behind or forwardly of the body 10. On either side of the body 10 are traction motors 38, only one of which is shown in FIG. 2. The traction motors, in turn, are connected through suitable drives and disc brake assemblies 40 to the rear wheels 12. Also carried on the vehicle is a pump motor 41 connected to a hydraulic pump 43 which supplies pressure for the hydraulic components of the shuttle car, including the hydraulic cylinder which elevates the discharge portion 22. All of the components of the shuttle car thus far described are conventional and need not be described in further detail.

Figure 3:
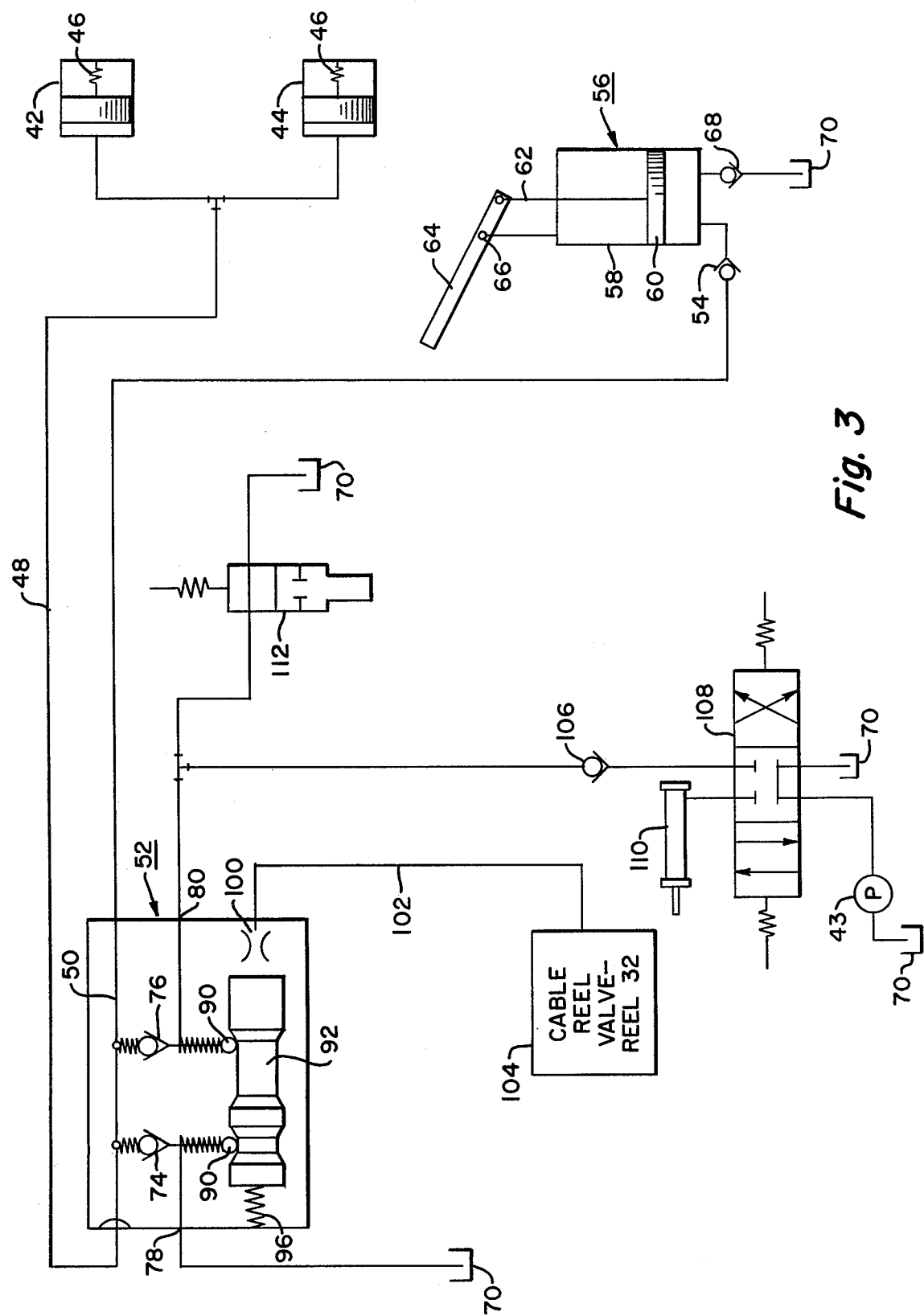
FIG. 3 is a schematic hydraulic circuit diagram of the brake system of the invention.

With reference now to FIGS. 2 and 3, a shuttle car such as that shown in FIGS. 1 and 2 is provided with disc-type emergency brakes, the actuating cylinders for which are identified by the reference numerals 42 and 44. Pistons within the cylinders 42 and 44 are normally biased by means of springs, such as Belleville washers, into their braking positions, the springs being indicated schematically by the reference numeral 46 in FIG. 3. When, however, hydraulic pressure is applied to conduit 48, the force exerted by the springs is overcome and the pistons within cylinders 42 and 44 are moved to positions where the brakes are released.

The conduit 48 is connected through an unrestricted passageway 50 in a shuttle valve 52 and through check valve 54 to a two-stage hand pump 56. The pump 56 includes a conventional cylinder 58 which carries a reciprocating piston 60. Piston 60, in turn, is connected through piston rod 62 to an end of a pump handle 64 pivotally mounted at 66. The inlet side of the pump 56 is connected through check valve 68 to a hydraulic reservoir 70. As will be appreciated, on the upward stroke of the piston 60, fluid will be drawn into the cylinder 58 from reservoir 70; and on the downward stroke of the piston, fluid within the cylinder 58 will be forced through the check valve 54 to the cylinders 42 and 44 to release the brakes when no power is applied to the vehicle.

Figure 4:
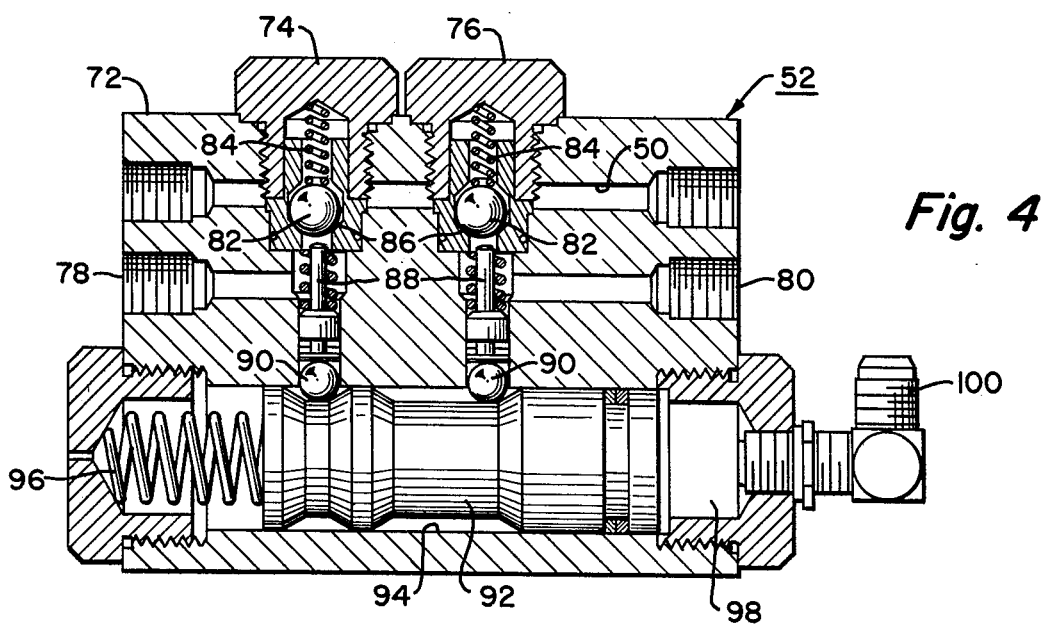
FIG. 4 is a detailed cross-sectional view of the shuttle valve employed in the hydraulic system of FIG. 3.

With reference now to FIG. 4, the details of the shuttle valve 52 are shown. It comprises a body 72 having the unrestricted passageway 50 extending therethrough. Connected to the passageway 50, at one side thereof, are two check valves 74 and 76 which normally block fluid flow from the passageway 50 to either port 78 or port 80. Each check valve 74 or 76 includes a spherical valve element 82 spring-biased by means of coil spring 84 into engagement with a lower valve seat 86. Engagement of the valve element 82 with valve seat 86 prevents fluid flow from passageway 50 to either port 78 or 80. Beneath the valve element 82 in each check valve is a spring-loaded plunger 88, normally biased downwardly as viewed in FIG. 4. Beneath each plunger is a spherical cam follower 90 which, in turn, rides on a spool 92. Spool 92 is reciprocable within a bore 94 in the valve body 72 and is spring-biased to the right by means of a coil spring 96. The spool 92, however, can be forced to the left as viewed in FIG. 4 by hydraulic pressure within a chamber 98 connected through a restricted orifice in fitting 100 to a source of fluid under pressure. When the spool 92 moves to the left, both spheres 90 will be moved upwardly to thereby force their plungers upwardly and unseat their associated spherical valve elements 82. Under these conditions, the pasageway 50 will be connected to port 78; while the same passageway will be connected to port 80. Continued leftward movement of the spool 92 will permit the plunger 88 and sphere 90 for valve 74 to move downwardly; however plunger 88 and sphere 90 for valve 76 will remain in their raised positions, thereby maintaining check valve 76 open. Under these circumstances, the passageway 50 is disconnected from port 78; however port 80 is connected to the passageway 50.

Reverting again to FIG. 3, elements of the shuttle valve 52 which correspond to those of FIG. 4 are identified by like reference numerals. It will be noted that the port 78 is connected to the reservoir 70; while the fitting 100 is connected through conduit 102 to a cable reel valve 104 for the cable reel 32 shown in FIG. 1. When power is supplied to the shuttle car, the cable reel valve 104 comes to pressure instantaneously, thereby pressurizing conduit 102 and forcing the spool 92 to the left. As the spool 92 moves to the left, check valve 74 will open, thereby connecting passageway 50 to the reservoir 70 through port 78. This dumps the pressure applied to the brake cylinder 42 and 44, with check valve 54 opening to also dump any pressure in pump 56. Continued leftward movement of the spool 92, as explained above, closes check valve 74 while check valve 76 remains open, thereby connecting the passageway 50 to port 80. Port 80 is connected through check valve 106 to a conveyor-elevate valve 108 located at the operator's platform 16 shown in FIGS. 1 and 2. Conveyor-elevate valve controls a hydraulic cylinder 110 which serves to elevate the discharge portion 22 into the broken-line position shown at 24. When the valve 108 is moved to the right as viewed in FIG. 3, cylinder 110 is connected to the pump 43 on the shuttle car to elevate the discharge section. However, when the valve 108 is moved to the left, pump 43 is then connected through valve 108 and check valve 106 to the port 80 in shuttle valve 52.

Instructions are given to the operator of the shuttle car to move the valve 108 to the left immediately after power is applied. This pressurizes port 80 and, through valve 76 and passageway 50, pressurizes the brake cylinders 42 and 44 to release the brakes. It should be understood, however, that any valve other than the conveyor-elevate valve 108 can be utilized to initially connect the pump 43 to the brake cylinders to release the brakes. If hydraulic pressure from the pump 43 should fail, as when the machine is turned OFF, pressure applied to fitting 100 will also fail. Spring 96 now pushes the spool 92 to the right; and as it does so, valve 74 will release all pressure from the brake cylinders 42 and 44, causing the brakes to be applied while the machine is shut down.

If, for any reason, electrical power should be removed from the car while the spool 92 is in its leftward position, a solenoid valve 112, held closed against the force of a spring when the solenoid is energized, will be deenergized, thereby connecting port 80 to the reservoir-return tank 70. This dumps pressure from the brake cylinders 42 and 44 and reapplies the same.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An emergency vehicle brake system comprising brake means, spring means for actuating the brake means to brake the vehicle, means including a power-operated pump on said vehicle for pressurizing said brake means to release the same against the force of said spring means when power is supplied to the vehicle, auxiliary pump means on said vehicle for pressurizing said brake means to release the same when power is not supplied to the vehicle, and shuttle valve means for connecting said power-operated pump to the brake means when power is supplied to the vehicle, said shuttle valve means being actuable when power is initially supplied to the vehicle to release pressure applied to the brake means by the auxiliary pump means before pressure is applied to the brake means by the power-operated pump, said shuttle valve means includes a pair of check valves which can be opened to permit flow in either direction by cam followers riding on the surface of a hydraulically-actuated spool, one of said valves when open connecting said brake means to a hydraulic reservoir, the other of said valves when open being adapted to connect the brake means to said power-operated pump.

2. The brake system to claim 1 wherein said auxiliary pump means comprises an operator-operated hand pump.

3. The brake system of claim 1 wherein said shuttle valve is actuated by hydraulic pressure produced when power is supplied to said vehicle.

4. The brake system of claim 1 wherein the auxiliary pump means is connected to said shuttle valve means through a check valve which will permit fluid to flow only from the auxiliary pump means to said shuttle valve means and said brake means.

5. The brake system of claim 1 wherein the side of each of the check valves which will normally resist fluid flow when closed is connected through conduit means to the brake means and through a third check valve to the auxiliary pump means.

6. The brake system of claim 1 wherein said spool, when hydraulically actuated, will initially open both of said check valves and then close said one valve while said other valve remains open.

7. The brake system of claim 6 including spring means for moving said spool when hydraulic pressure is removed therefrom.

* * * * *